(12) United States Patent
Reissner et al.

(10) Patent No.: US 10,662,583 B2
(45) Date of Patent: May 26, 2020

(54) INDUSTRIAL PLANT, PAPER MILL, CONTROL DEVICE, APPARATUS AND METHOD FOR DRYING DRYING-STOCK

(71) Applicant: Siemens Aktiengesellschaft, Munich (DE)

(72) Inventors: Florian Reissner, Nuremberg (DE); Hermann Schwarz, Wuerzburg (DE); Jochen Schaefer, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/329,984

(22) PCT Filed: Jul. 29, 2015

(86) PCT No.: PCT/EP2015/067364
§ 371 (c)(1),
(2) Date: Jan. 27, 2017

(87) PCT Pub. No.: WO2016/016297
PCT Pub. Date: Feb. 4, 2016

(65) Prior Publication Data
US 2017/0268173 A1    Sep. 21, 2017

(30) Foreign Application Priority Data
Jul. 29, 2014  (DE) .................. 10 2014 010 984

(51) Int. Cl.
*D21F 5/20* (2006.01)
*F26B 23/00* (2006.01)
*F26B 21/02* (2006.01)
(52) U.S. Cl.
CPC ............... *D21F 5/20* (2013.01); *F26B 21/02* (2013.01); *F26B 23/005* (2013.01); *Y02B 30/52* (2013.01); *Y02P 70/405* (2015.11)

(58) Field of Classification Search
CPC .......... F25B 30/00; F25B 9/002; F25B 9/004; F26B 21/02; F26B 23/005;
(Continued)

(56) References Cited

U.S. PATENT DOCUMENTS 3,798,785 A * 3/1974 Chamouton ............. D06C 7/00
34/568
4,428,853 A * 1/1984 Ramet .................... C09K 5/044
252/67

(Continued)

FOREIGN PATENT DOCUMENTS

CN    101363682    2/2009
DE    26 30 853    12/1977
(Continued)

OTHER PUBLICATIONS

Lambauer et al., in "Industrial heat pumps in Germany: Potentials, techonolgical development and market barriers," Intitute for Energy Economics teh Rational Use of Energy (IER), Universität Stuttgart, pp. 1-18. (Year: 2012).*

(Continued)

*Primary Examiner* — Jose A Fortuna
(74) *Attorney, Agent, or Firm* — Cozen O'Connor

(57) ABSTRACT

A method for drying drying-stock includes separating solvent-containing drying stock within a drying unit into a base material and a solvent with the aid of a first heat transfer medium that flows through a first circuit, where after the solvent has been taken up by the first heat transfer medium, the solvent is extracted from the heat transfer medium via heat energy (condensation), where the heat energy is transferred by a heat exchanger with the aid of an evaporation unit to a second circuit and made available to a second heat (Continued)

transfer medium, and where the heat energy is fed in a condensation unit of the heat pump back to the first circuit with the aid of a heat pump.

10 Claims, 6 Drawing Sheets

(58) Field of Classification Search
CPC ...... F28D 2021/0068; F28D 7/00; F28D 9/00; F28F 13/00; D06F 2058/287; D06F 58/206; D21F 5/20; C09K 5/044; Y02B 30/52; Y02P 70/405
See application file for complete search history.

(56) References Cited

U.S. PATENT DOCUMENTS

| | | | | |
|---|---|---|---|---|
| 4,644,664 | A * | 2/1987 | Bradshaw | F26B 3/084 34/361 |
| 5,210,958 | A * | 5/1993 | Bond | D21F 5/00 34/422 |
| 7,260,940 | B2 * | 8/2007 | Watanabe | F25B 23/00 62/114 |
| 9,885,505 | B2 * | 2/2018 | Reissner | F25B 40/06 |
| 2005/0155355 | A1 * | 7/2005 | Watanabe | F25B 23/00 62/4 |
| 2007/0017113 | A1 * | 1/2007 | Scharpf | D06F 58/206 34/86 |
| 2011/0000099 | A1 * | 1/2011 | Steffens | D06F 58/206 34/493 |
| 2012/0304488 | A1 * | 12/2012 | Pardo | F26B 23/002 34/514 |
| 2013/0174552 | A1 * | 7/2013 | Mahmoud | F01K 23/02 60/671 |
| 2014/0174110 | A1 * | 6/2014 | Van Horn | C09K 5/044 62/77 |
| 2014/0290091 | A1 * | 10/2014 | Bison | D06F 58/206 34/524 |
| 2014/0375737 | A1 * | 12/2014 | Van Beek | B41J 11/002 347/102 |
| 2016/0017199 | A1 * | 1/2016 | Yana Motta | C09K 5/045 62/114 |
| 2016/0102902 | A1 * | 4/2016 | Gromoll | F25B 30/02 62/115 |
| 2016/0123636 | A1 * | 5/2016 | Grommoll | F04C 19/004 62/114 |
| 2016/0138837 | A1 * | 5/2016 | Gromoll | F25B 30/02 62/115 |
| 2017/0266995 | A1 * | 9/2017 | Ramackers | B41J 29/377 |
| 2017/0268173 | A1 * | 9/2017 | Reissner | D21F 5/20 |

FOREIGN PATENT DOCUMENTS

| | | | | |
|---|---|---|---|---|
| DE | 3837133 C1 * | 4/1990 | | D21F 5/20 |
| EP | 2613026 A2 * | 7/2013 | | F01K 23/02 |
| SU | 1239486 A1 * | 6/1986 | | |
| WO | WO 82/02939 | 9/1982 | | |
| WO | WO 86/02149 | 4/1986 | | |
| WO | WO-2015160881 A1 * | 10/2015 | | F25B 1/053 |
| WO | WO-2016016297 A1 * | 2/2016 | | D21F 5/20 |

OTHER PUBLICATIONS

K. Kontomaris in "Low GWP Working Fluid for High Temperature Heat Pumps: DR-2" European Heat Pump Summit 2013, pp. 1-28. (Year: 2013).*
Hulse et al., in Physical Properties of HCFO-1233zd(E), Journal of Chemicaql & Engineering Data, vol. 57 pp. 3581-3586 (Year : 2012).*
Office Action dated Nov. 13, 2017 which issued in the corresponding Chinese Patent Application No. 201580041163.7.
Zheng, J. "Organic Chemistry," First Edition, Mar. 31, 2008, (13 pages).
Office Action dated Jun. 19, 2018 issued in the corresponding Chinese Patent Application No. 2015800411637.
Wang, Yarong, "Heat exchanger", China machine press; 2012; pp. 4-7.

* cited by examiner

INDUSTRIAL PLANT, PAPER MILL, CONTROL DEVICE, APPARATUS AND METHOD FOR DRYING DRYING-STOCK

CROSS-REFERENCE TO RELATED APPLICATIONS

This is a U.S. national stage of application No. PCT/EP2015/067364 filed 29 Jul. 2015. Priority is claimed on German Application No. 10 2014 010 984.4 filed 29 Jul. 2014, the content of which is incorporated herein by reference in its entirety.

BACKGROUND OF THE INVENTION

1. Field of the Invention

The invention relates to an industrial plant, a paper mill, a control device, an apparatus and a method for drying drying-stock.

2. Description of the Related Art

The production of cellulose-containing base materials, such as paper or cardboard, entails the drying of water-containing or solvent-containing drying stock, in particular a pulp or a cellulose-containing web, at different points. At present, drying of this kind is performed via contact drying or through-flow drying. With through-flow drying in a drying unit, gas or steam is guided at a temperature (if possible above 100° C.) through or over the drying-stock. During this, at least a part of the solvent evaporates and is separated from the base material by the flow of steam.

The disadvantage of this method is the high requirement for thermal energy and the high amount of waste heat produced. A further development is a circuit, where the circuit is based on the circulation of a heat transfer medium, in particular water-vapor-containing air, at a high temperature. Here, the circuit comprises a heating unit and a drying unit. The heating unit is used to heat a heat transfer medium, the drying unit is used to dry drying-stock (the actual drying-stock and solvent) via the heat transfer medium and an optional condenser for the solvent, in particular water, is used to extract the solvent from the heat transfer medium.

SUMMARY OF THE INVENTION

It is the object of the invention to improve the drying of drying-stock in a manner that makes the drying more energy-efficient.

This and other objects and advantages are achieved in accordance with the invention by an industrial plant, a paper mill, a control device, an apparatus and method in which a first heat transfer medium is provided for drying the drying-stock, where a second circuit comprises a heat pump for feeding heat energy into the first circuit. A circuit is understood to be a tube system through which a heat transfer medium circulates.

In this context, the first circuit is used for the circulation of a first heat transfer medium. The first circuit is in particular used to feed the first heat transfer medium back into a drying unit.

The second circuit is coupled to the first circuit. In accordance with the invention, the second circuit comprises a heat pump for feeding heat energy into the first circuit.

Possible examples of eligible drying-stock include a fiber mat, in particular paper or cardboard, a cellulose-containing base material for the paper production, old paper mixed with water but also a base material in the production of foodstuffs.

A first heat transfer medium is preferably understood to be a gas suitable for drying drying-stock with the aid of a drying unit. Preferably, a mixture of air and water vapor is used as the first heat transfer medium.

For the purposes of the invention, the drying unit is used to dry the drying-stock, i.e., to separate the drying-stock from a solvent by passing through a first heat transfer medium. A drying unit of this kind can be a flow-through dryer. In this case, the drying unit is used to separate the drying-stock from a solvent, which is taken up by the first heat transfer medium. At another place in the first circuit, in particular in an evaporation unit, the solvent is again separated from the first heat transfer medium and removed from the first circuit.

The second heat transfer medium used is preferably a highly volatile liquid. The second heat transfer medium takes up heat energy on one side and gives off the heat energy taken up at another point of the circuit.

Advantageously, an evaporation unit is used to take up the heat energy in the second circuit. The second heat transfer medium is evaporated in an evaporation unit, i.e., converted from the liquid phase to the gaseous phase. During this conversion, the heat of evaporation is taken up and fed to the second heat transfer medium.

Heat energy can also be fed to the second circuit by further heat sources. The heat sources used are preferably a waste heat source of an electric machine or an internal-combustion engine. It is also possible to use a conventional heat source, at least intermittently.

A heat pump typically comprises an evaporation unit and a condensation unit. To transport the heat transfer medium, the heat pump also comprises a pump, where the pump is provided to transport the second heat transfer medium from the evaporation unit to the condensation unit. The evaporation unit is used to evaporate the second heat transfer medium. On evaporation, heat energy is taken up by the second heat transfer medium. The condensation unit is used for the condensation of the gaseous second heat transfer medium. On condensation, heat energy is given off by the second heat transfer medium.

The first circuit advantageously comprises a blower for transporting the first heat transfer medium. The blower is used to maintain the circulation of the first heat transfer medium. Advantageously, no heat transfer medium exchange occurs between the first circuit and the second circuit. This avoids mixing or intermingling of the first heat transfer medium and the second heat transfer medium.

The heat energy is advantageously transferred by a condensation unit of the heat pump to the first heat transfer medium in the first circuit. The condensation unit is a heat exchanger, which transfers the heat energy of the condensing second heat transfer medium to the first heat transfer medium.

To enable the first heat transfer medium to be used repeatedly, in a first circuit, the first heat transfer medium passes through the drying unit where it takes up solvent. The solvent is given off again at a different point. The second heating circuit is also used to feed heat energy to the first heat transfer medium. When it has been fed with heat energy, the first heat transfer medium is fed back to the drying unit. The heat energy is fed into the first circuit with the aid of the second circuit, where the second circuit is formed as a heat pump, in particular a high-temperature heat pump. The heat pump can take up heat energy from the first circuit and refeed feed energy to the first heating circuit at a different point. A second circuit formed as a heat pump can also take up the heat energy from a reservoir or the environment.

Advantageously, the first heat transfer medium has a first temperature of from 100° C. to 200° C., particularly advantageously 130° C. to 160° C. before the drying unit. The first heat transfer medium is advantageously water vapor, in particular superheated water vapor, which is advantageously heated by the taking up of solvent, in particular water, in the drying unit.

The use of a heat pump to heat the first heat transfer medium reduces energy consumption during operation of the drying unit. A particularly compact embodiment of an apparatus for drying drying stock is obtained with the simultaneous taking-up of heat energy from the first circuit. In one advantageous embodiment, the second circuit draws heat energy from the first circuit.

Preferably an evaporation unit is used when the heat energy is taken up from the first circuit. The evaporation unit is used to take up heat energy from the first heat transfer medium, in particular on the condensation of the solvent from the first heat transfer medium. The evaporation unit is used to transfer heat energy from the first circuit to the second circuit. The heat energy taken up from the first circuit is used to evaporate the second heat transfer medium. Taking up heat energy from the first circuit advantageously causes the solvent from the first heat transfer medium to be condensed. Prior to this, the solvent was fed in the drying unit to the first heat transfer medium during the drying of the drying-stock.

Both the condensation unit and the evaporation unit are advantageously formed as heat exchangers. Suitable heat exchangers are in particular many types of recuperators, such as plate heat exchangers, spiral heat exchangers, tube-bundle heat exchangers or counter-current heat exchangers. A tube-bundle heat exchanger is particularly advantageous. This embodiment is advantageous because the condensation heat of the solvent can be fed back to the circuit.

In a further advantageous embodiment, the apparatus comprises at least one further heat pump for feeding heat energy into the first circuit and/or into the second circuit. Advantageously, the further heat pump is used to provide the heat energy for the first circuit or for the second circuit. To heat the first heat transfer medium and/or the second heat transfer medium, the further heat pump can draw heat energy from a reservoir. Advantageously, the use of a further heat pump enables losses in a circuit to be compensated with the aid of a reservoir, in particular a reservoir of waste heat.

In a further advantageous embodiment, the first circuit and the second circuit are only connected by heat exchangers.

As explained above, the condensation unit and the evaporation unit are preferably formed as heat exchangers. This efficiently prevents the mixing of the first and the second heat transfer medium and advantageously protects the drying stock from contaminants in the second heat transfer medium.

In a further embodiment of the apparatus, an evaporation unit is provided for feeding the heat energy from the first circuit into the second circuit. The evaporation unit is used to take up the heat energy released on condensation of the solvent in the first circuit. Both the evaporation unit and the condensation unit are used to evaporate or condense the second heat transfer medium.

The use of an evaporation unit, which is advantageously part of the heat pump, enables the heat energy to be transferred from the first circuit to the second circuit. The advantage of an evaporation unit is that the heat energy released on the condensation of the solvent can be transferred particularly efficiently to the second heat transfer medium.

In a further embodiment of the apparatus, the first circuit comprises a blower. The blower is used to maintain the circulation of the first heat transfer medium in the first circuit. A blower advantageously enables the speed of circulation of the first heat transfer medium to be controlled or regulated by the first circuit. Control or regulation is advantageously performed with a control device as herein described or a global process control in the plant in which the apparatus is integrated.

In one advantageous embodiment, the heat pump is a high-temperature heat pump. A high-temperature heat pump is characterized by particularly high efficiency in a temperature range above 100° C. For example, a high-temperature heat pump can advantageously be used to transfer heat energy from the evaporation unit to the condensation unit.

In addition to the evaporation unit and the condensation unit, the (high-temperature) heat pump comprises a compressor. The compressor is used to transport the second heat transfer medium from the evaporation unit in the gaseous phase and/or to transport the second heat transfer medium from the condensation unit to the evaporation unit. A high-temperature heat pump is in particular characterized by the use of a suitable second heat transfer medium.

In one advantageous embodiment of the apparatus, a condensation unit is provided for feeding the heat energy into the first circuit. Like the evaporation unit, the condensation unit is part of the (high-temperature) heat pump. The condensation unit is used to condense the second heat transfer medium and to transfer the heat energy released on the condensation of the second heat transfer medium to the first heat transfer medium. The condensation unit is also advantageously formed as a heat exchanger. The use of a condensation unit enables the heat energy to be particularly efficiently transferred from the second circuit into the first circuit.

In a further advantageous embodiment of the apparatus, the first heat transfer medium for the first circuit is water vapor or a mixture of water vapor and air. Before entering the drying unit, the drying-stock generally consists of a mixture of water and a base material, for example, a cellulose-containing base material such as pulp. The water is evaporated from the base material, and hence separated from the base material, with the aid of the drying unit. Here, the separation of the water from the base material occurs via the action of the first heat transfer medium on the drying stock. In this context, the first heat transfer medium takes up the water, in particular by evaporation.

The advantages of using water vapor as the first heat transfer medium are the high heat transfer coefficient and the high heat coefficient of water. Also advantageous is the wide use of water vapor in the field of industrial plants. Another advantage is the fact that the first heat transfer medium does not contaminate the evaporated water.

In a further advantageous embodiment of the apparatus, the heat transfer medium for the second circuit is a halogenated hydrocarbon, in particular R1233zd(E) or R1336mzz(Z). For a temperature range above 100° C., there are various heat transfer media that are particularly suitable for use, such as R1233zd(E) R1336mzz(Z), NOVEC524, R245fa, R1234ze(E) or R1234ze(Z). In this case, R1233zd(E) stands by way of example for 1-chloro-3,3,3-trifluorpropene. As explained below, due to their condensation properties and their evaporation properties, the heat transfer media are particularly suitable for use in high-temperature heat pumps.

In one advantageous embodiment of the method, the second circuit draws at least part of the heat energy from the first circuit. The heat energy from the first circuit is fed to the second circuit via a heat exchanger. This advantageously enables the temperature of the first heat transfer medium to be controlled or regulated. Also advantageously, condensation of the solvent results in the removal of heat energy from the first circuit. In this way, the solvent is separated from the first heat transfer medium.

In a further advantageous embodiment of the method, at least one further heat pump heat feeds energy into the first circuit and/or into the second circuit. Feeding further heat energy into the first circuit and/or the second circuit advantageously enables the losses of the first circuit to be compensated. For example, it is advantageously possible for the temperature of the first heat transfer medium to be regulated very precisely, in particular with the aid of the control device.

In a further advantageous embodiment of the method, the first circuit and the second circuit are only connected by heat exchangers. Particularly advantageous for the transfer of heat energy with the aid of heat exchangers is the separation of the material flows. Thus, the second heat transfer medium is not contaminated by remnants of the drying stock or the like.

In addition to drying a cellulose-containing base material or a fiber mat, the disclosed embodiments of the invention are suitable for drying wood pellets, sewage sludge, foodstuffs, construction materials and for use in the chemical industry for separating solvents from drying-stock or another mixture.

In summary, the embodiments of the invention disclosed herein achieve a saving of energy during the production, in particular the drying, of a base material. This energy saving results in resource-saving production of base materials, in particular pulp and paper. At the same time, the waste heat from further processes can be used more efficiently than previously for energy production. In addition, the separation of the first circuit from the second circuit prevents the contamination of the heat transfer media. For example, parts of the heat pump can be efficiently protected from remnants of the drying stock.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following describes and explains the invention with reference to figures. The features in the individual figures can also be used by the person skilled in the art to arrive at new embodiments of the invention without departing from the essence of the invention, in which.

DETAILED DESCRIPTION OF THE EXEMPLARY EMBODIMENTS

Figure 1:
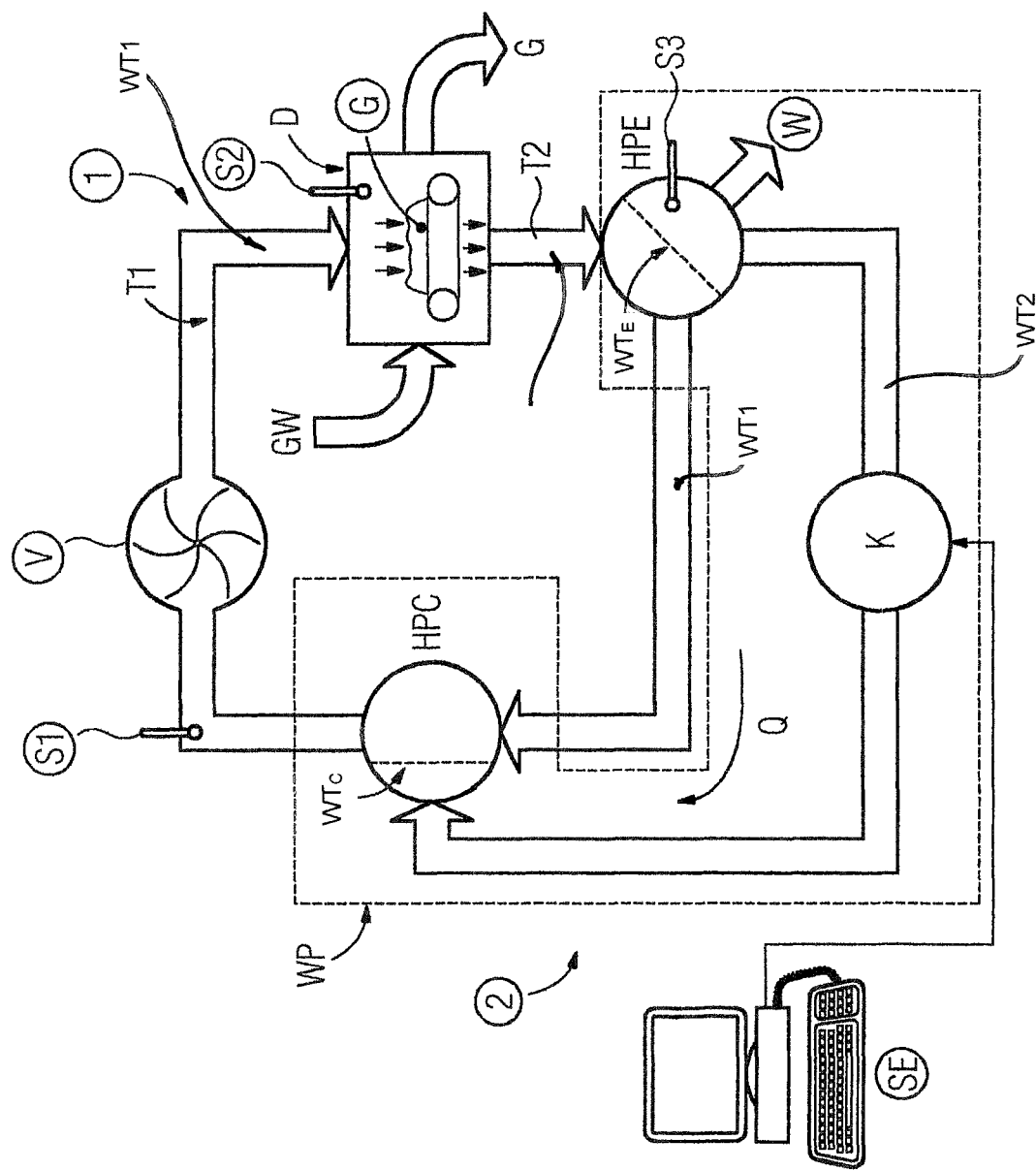
FIG. 1 an apparatus for drying drying stock in accordance with the invention.

FIG. 1 shows an apparatus for drying drying stock GW. The apparatus shows a first circuit 1 for a first heat transfer medium WT1, in particular water vapor. In the first circuit 1, the first heat transfer medium WT1 is transported through a drying unit D with the aid of a blower V. Here, the heat transfer medium WT1 used is water vapor, preferably with a temperature of between 100° C. and 200° C. The first heat transfer medium has a first temperature T1 before the drying unit D. The first heat transfer medium WT1 also has a lower second temperature T2 after the drying unit. The drying unit D is used for drying the solvent-containing drying-stock GW.

Here, the solvent-containing drying-stock GW comprises, in particular fiber-containing, a solid material G and a solvent W, in particular water. The solvent W is evaporated during drying in the drying unit D and is taken up by the first heat transfer medium WT1. The taking-up of the solvent W by the first heat transfer medium WT1 causes the temperature of the first heat transfer medium WT1 to be reduced from the first temperature T1 to the second temperature T2. After the drying unit D, the first heat transfer medium WT1 is transferred to the evaporation unit HPE. The solvent W is condensed in the evaporation unit HPE and separated from the heat transfer medium WT1. The heat energy Q released on the condensation of the solvent is transferred to the second heat transfer medium WT2 with the aid of the evaporation unit HPE. The evaporation unit HPE is substantially formed as a heat exchanger WT. The first heat transfer medium WT1 without the solvent W is further transferred to a condensation unit HPC. The condensation unit HPC transfers the heat energy Q removed from the first heat transfer medium WT1 with the aid of the evaporation unit HPE to the first heat transfer medium WT1.

The (re-)feeding of the heat energy Q into the first circuit 1 occurs with the aid of the second circuit 2. The second circuit 2 is formed as a heat pump WP. The heat pump WP comprises the evaporation unit HPE, a compressor K and the condensation unit HPC. The second heat transfer medium WT2 is used to remove heat energy with the aid of the evaporation unit HPE from the first circuit 1 and, in this way, the solvent W from the first heat transfer medium WT1 is condensed. After condensation, the solvent W is removed from the first circuit 1.

The second circuit 2 is formed as a heat pump WP, in particular as a high-temperature heat pump WP. The heat pump WP is used to transport the heat energy Q from the evaporation unit HPE to the condensation unit HPC. The heat pump WP comprises the evaporation unit HPE, the condensation unit HPC and a compressor K. The compressor K is used to transport the second heat transfer medium WT2 from the evaporation unit HPE to the condensation unit HPC (in gaseous state) and back (in condensed state).

Both the condensation unit HPC and the evaporation unit HPE comprise a heat exchanger $WT_E$. The heat exchanger in the evaporation unit HPE is used to transfer the heat energy Q from the first circuit 1 to the second circuit 2. The heat exchanger $WT_C$ is used to transfer the heat energy Q from the second circuit 2 back to the first circuit 1.

The heat exchangers $WT_E$, $WT_C$ are in particular used to transfer heat energy Q from the first heat transfer medium WT1 to the second heat transfer medium WT2 and back. The heat exchangers $WT_E$, $WT_C$ are preferably formed as tube-bundle heat exchangers.

The second heat transfer medium WT2 used is preferably a halogenated hydrocarbon. The heat transfer medium WT2 with the designation R1233zd(E) (CAS number 102687-65-0, chemical designation: 1-chloro-3,3,3-trifluoropropene) has been found to be particularly advantageous.

The first heat transfer medium WT1 particularly advantageously has a first temperature T1 of 140° C. to 160° C. before entering the drying unit D.

After the drying unit D, the first heat transfer medium WT1 has a second temperature T2 of 80° C. to 120° C. auf. After the drying unit D, the first heat transfer medium WT1 can be a supersaturated water vapor. Before the drying unit D, the first heat transfer medium WT1 can be superheated water vapor. The heat pump WP typically comprises a turbine, a compressor or a pump to transport the second heat transfer medium WT2. The heat pump WP further comprises at least one expansion valve (not shown).

The compressor K in the heat pump WP is advantageously controlled or regulated by a control device SE. The control device SE also comprises inputs for sensors S1, S2, S3. The sensors S1, S2, S3 are used to determine the first temperature T1, the second temperature T2 and optionally to determine the water content of the first heat transfer medium WT1. The sensors can be located at different points in the first circuit 1, in the second circuit 2, in particular in the region of the drying unit D, in the region of the evaporation unit HPE and/or in the region of the condensation unit HPC. The speed of the compressor of the heat pump WP is controlled or regulated depending upon the temperature difference between the first temperature T1 and the second temperature T2. The control device SE can comprise a personal computer with a corresponding interface, a microcontroller or a part of a higher-ranking control device. Advantageously, the control device is formed as a computer program which is installed and executed on a computing unit, in particular a personal computer.

The dashed lines with the evaporation unit HPE and the condensation unit HPC symbolize that here only heat energy Q from the first circuit 1 is transported into the second circuit 2 (and vice versa) and the heat exchangers $WT_E$, $WT_C$ are typically formed as impermeable to heat transfer media WT1, WT2.

Figure 2:
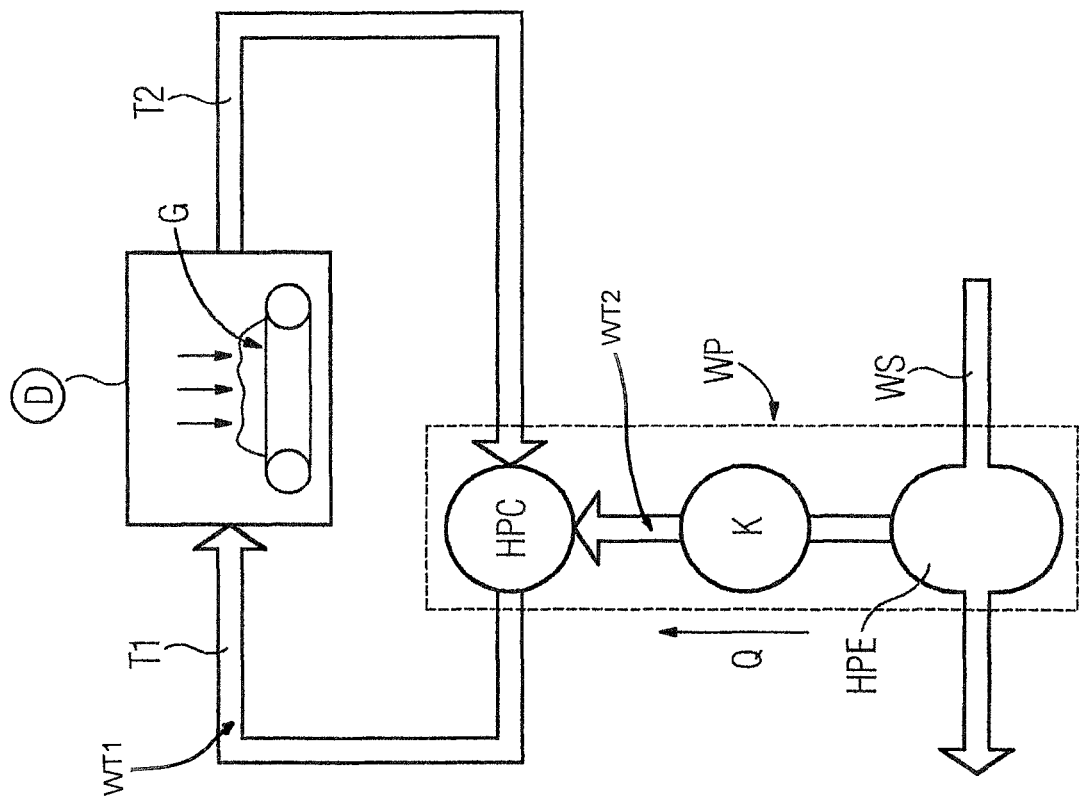
FIG. 2 a simplified apparatus for drying drying-stock in accordance with the invention.

FIG. 2 shows a simplified embodiment of the apparatus for drying a solvent-containing drying stock GW. As in FIG. 1, the drying unit D is used to dry the solvent-containing drying-stock GW. The drying unit D is used to separate the solvent-containing drying-stock GW in the base material G, in particular a cellulose-containing base material, and the solvent W, in particular water.

Similarly to the preceding embodiments, this simplified embodiment comprises, a first circuit 1 for the first heat transfer medium WT1 and a second circuit 2 for a second heat transfer medium WT2. The second circuit 2 comprises a heat pump WP. The heat pump WP is used to transport heat energy Q from a heat flow WS, in particular from a heat reservoir. The heat pump WP transfers heat energy Q from the heat reservoir WS into the first circuit 1. Preferably, a heat exchanger $WT_E$, $WT_C$ is used to provide the heat energy Q to increase the temperature of the first heat transfer medium WT1. The heat exchanger $WT_E$, $WT_C$ is also made available to the first heat transfer medium WT1 with the aid of a condensation unit HPE (or also an evaporation unit HPC).

Before the drying unit D, the first heat transfer medium WT1 has a temperature T1. After the drying unit D, the heat transfer medium has a lower temperature T2. Hence, the heat energy Q that is lost due to the drying unit D is fed to the heat transfer medium with the aid of the heat pump WP. Here, the solvent W can escape at one point of the circuit 1.

Therefore, the heat pump WP is used in this simplified embodiment to compensate the heat energy Q which is drawn off in the drying unit D and by the outgoing solvent W.

With the aid of a heat exchanger, which is preferably formed as a regenerator, a heat exchanger $WT_E$, $WT_C$ enables the evaporation unit HPE and the condensation unit HPC to be formed by a single regenerative heat exchanger. Here, heat energy Q is fed to the first circuit 1 in a first time range and removed in a further time range. The time ranges can be repeated periodically.

This embodiment is particularly advantageous because the heat pump WP is used to transfer heat energy Q from a heat flow WS into the first circuit 1 even though the temperature of the heat flow WS is lower than the second temperature T2.

Figure 3:
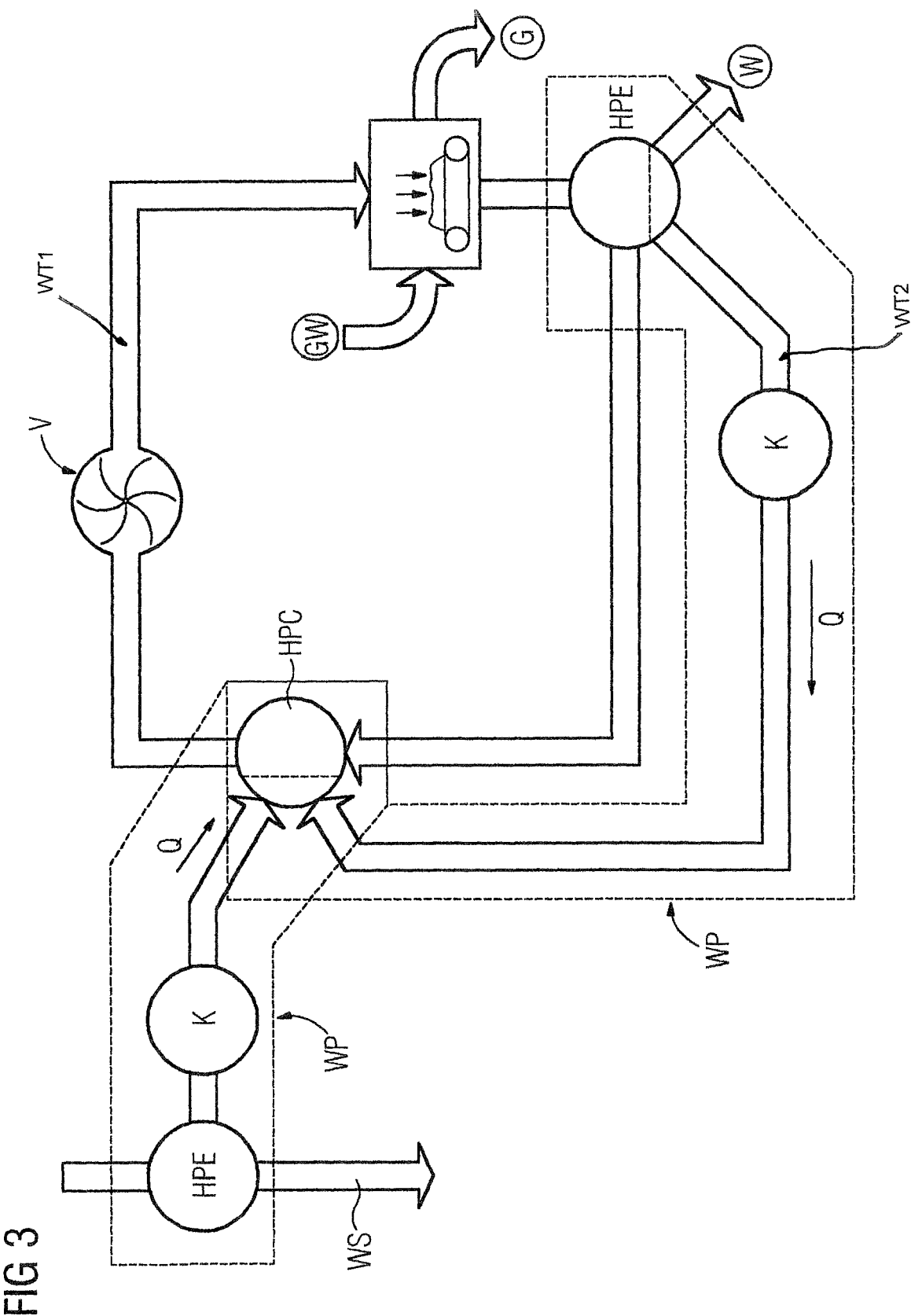
FIG. 3 a further apparatus for drying drying-stock in accordance with the invention.

FIG. 3 shows a further embodiment of the apparatus for drying drying stock GW. This embodiment represents a combination of the embodiments shown and described in FIG. 1 and FIG. 2. The embodiment shown here comprises two heat pumps WP. The first heat pump WP is used to take up the condensation heat of the solvent W. The first heat pump transfers the heat energy Q with the aid of the compressor to the condensation unit. In this case, the condensation unit is used to transfer heat energy Q into the first circuit 1. The further heat exchanger WP is used to provide additional heat energy Q for the first circuit 1. The second heat pump WP is used to compensate heat energy losses from the first circuit 1. Depending upon the temperature of the first heat transfer medium WT1 and the requirement for heat energy Q, the second heat pump WP is used to transfer heat energy Q from a heat flow WS or reservoir into the first circuit 1. Control and/or regulation of the first heat pump WP and the second heat pump WP is performed by a control device SE in conjunction with sensors S1, S2, S3 (not shown here). Reference is made to FIG. 1 with respect to the control device SE.

In particular, at the start of the operation of the industrial plant, additional heat energy can be fed to the first circuit 1. In particular, it is also possible for heat energy Q obtained in a conventional way, for example, by the combustion of a fuel or with the aid of electric energy, to be fed to the first circuit 1 and/or the second circuit 2.

Figure 4:
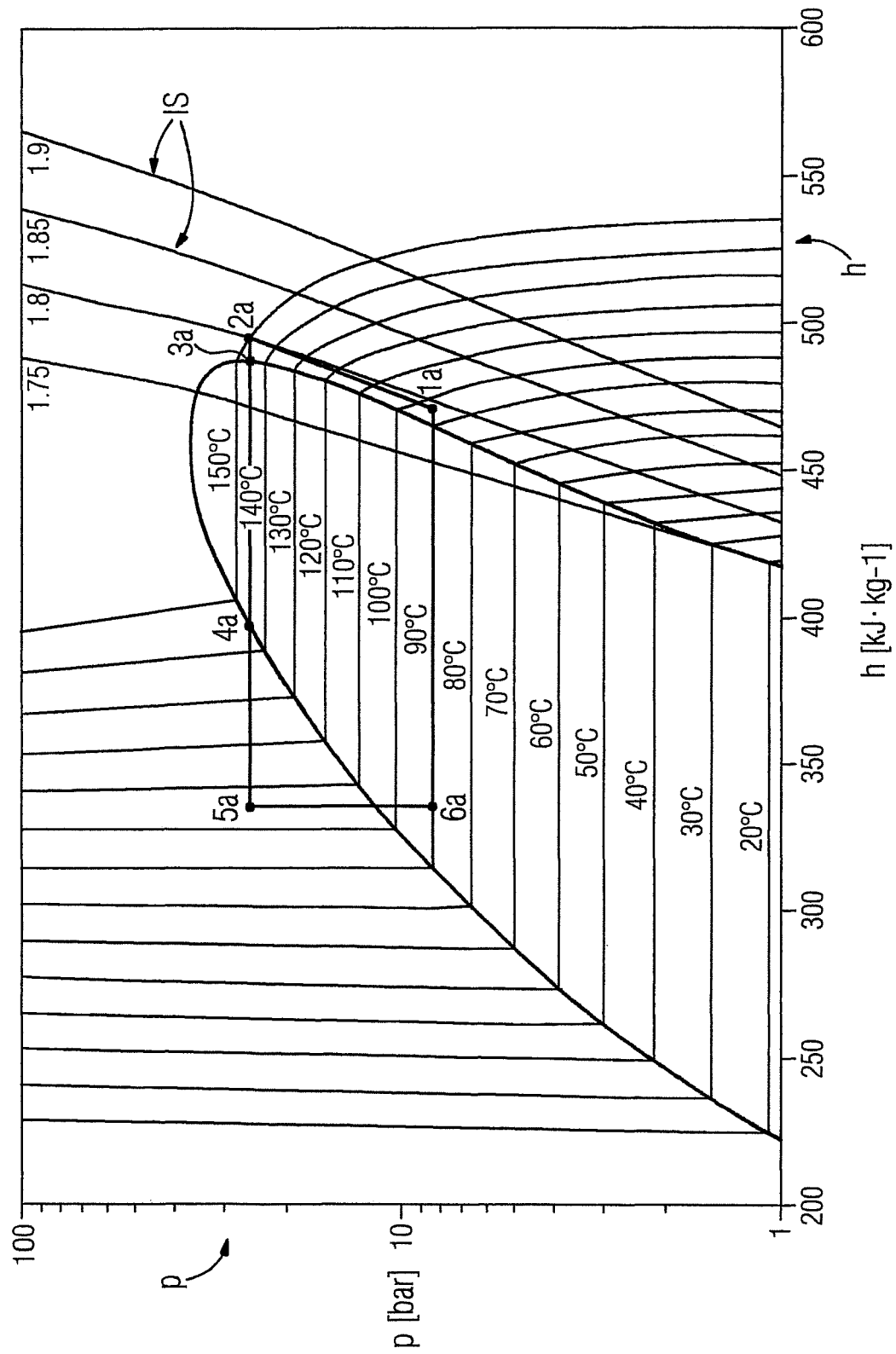
FIG. 4 a pressure-enthalpy diagram of a preferred second heat transfer medium in accordance with the invention.

FIG. 4 is a pressure-enthalpy diagram of a preferred second heat transfer medium WT2. The enthalpy h is plotted in [kJ/Mol] on the horizontal axis. The pressure p in [bar] is plotted logarithmically on the perpendicular axis. The diagram shows a set of curves of isotherms, where the temperature (of the second heat transfer medium) is shown above the respective isotherms in degrees Celsius. The isotherms depicted indicate the behavior of a preferred second heat transfer medium R1233zd(E) of the pressure p as function of the enthalpy h. The envelope of the points at which the isotherms have a kink corresponds to the phase boundaries of the second heat transfer medium WT2. The upper region of the envelope depicts a thermodynamic cycle comprising the following points 1a, 2a, 3a, 4a, 5a, 6a. The thermodynamic cycle corresponds to the cycle for the (high-temperature) heat pump. Here, the transitions are:

| | |
|---|---|
| 1a -> 2a | polytropic compression, |
| 2a -> 3 | isobaric cooling, |
| 3a -> 4a | isobaric liquefaction, |
| 4a -> 5a | isobaric cooling (supercooling), |
| 5a -> 6a | isobaric evaporation and heating to superheating of the second heat transfer medium WT2. |

The second heat transfer medium WT2 is present in the left region as a supercooled liquid. Hence, the rise in the isotherms is very steep. In the right-hand region of the diagram, the isotherms fall more slowly after evaporation with increasing enthalpy. In the right-hand region, the second heat transfer medium WT2 is present as superheated gas.

During the (polytropic) compression 1a→2a of the second heat transfer medium WT2, it is compressed to a temperature slightly above the first temperature T1, in this case about 145° C. In addition, the expansion of the second heat transfer medium advantageously occurs from the temperature above the second temperature T2 to a temperature (about 90° C.) slightly below the second temperature T2 of the first heat transfer medium WT1 in the evaporation unit HPE.

Also shown are isentropes IS as steeply rising curves. Those assigned to the isentropes IS correspond to states of equal entropy. The numbers express this entropy in [kJ/(kg*K)].

The extreme supercooling of the second heat transfer medium WT2 to about 5 to 10 kelvin above the inlet temperature (first temperature T1) of the first heat transfer medium WT1 in the condensation unit HPC can cause the ratio of useful power to working power (rating number COP) to increase by up to 40% compared to the current state of the art.

Figure 5:
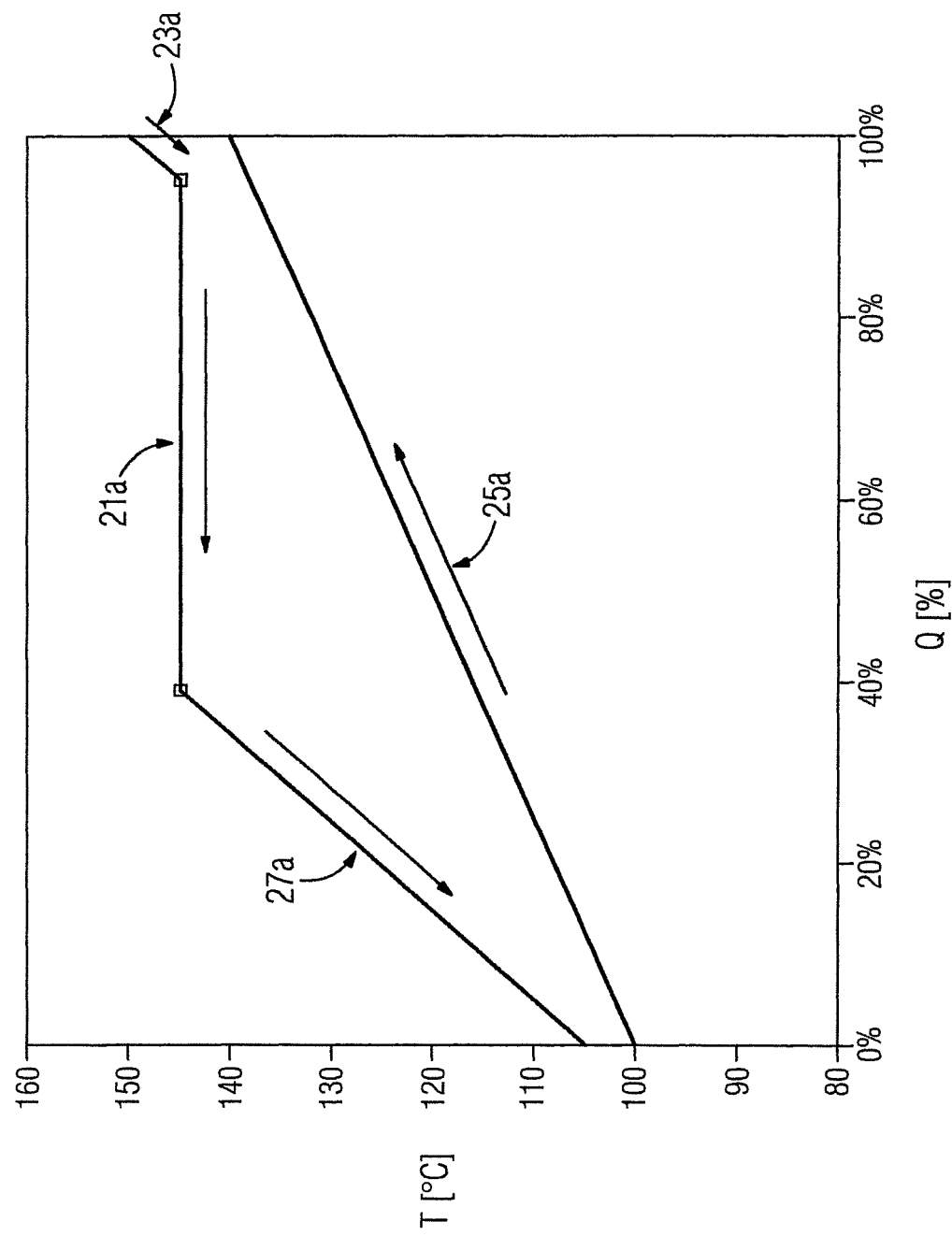
FIG. 5 a heat-transfer-temperature diagram of a preferred second heat transfer medium in accordance with the invention.

FIG. 5 is a heat-transfer-temperature diagram of a preferred second heat transfer medium WT2. The upper segment describes the transfer of heat energy Q from the first heat transfer medium WT2 to the second heat transfer medium WT1. The transfer of heat energy Q is symbolized in the upper curve 21a, 23a, 27a. During heat withdrawal 23a, the second heat transfer medium is cooled from a temperature above the second temperature T2 by about 5 kelvin. In this case, a small portion of heat energy Q is transferred from the second heat transfer medium WT2 to the first heat transfer medium WT1. On condensation of the second heat transfer medium, a further part of the heat energy Q is transferred from the second heat transfer medium WT2 to the first heat transfer medium WT1. On condensation of the second heat transfer medium WT2, the temperature of the second heat transfer medium WT2 remains approximately constant. On the further supercooling 27a of the second heat transfer medium WT2, the temperature of the second heat transfer medium WT2 drops from about 105° C. Up to here, the heat energy Q to be transferred by the second heat transfer medium WT2 is given off. This process in particular occurs in the condensation unit.

The heat energy Q given off by the second heat transfer medium WT2 is taken up by the first heat transfer medium WT1. Here, the temperature of the first heat transfer medium WT1 rises from the second temperature T2 (in this example 100° C.) to the first temperature T1 (here 140° C.). The temperature increase occurs during the superheating 25a of the first heat transfer medium.

For the thermodynamic considerations dealt with in the figures described here (here FIG. 1 to FIG. 5), a particularly preferred first heat transfer medium WT1 is water vapor and a particularly preferred second heat transfer media WT2 are the halogenated hydrocarbons R1233zd(E) and/or R1336mzz(Z).

The first heat transfer medium WT1 is particularly advantageously introduced into the drying unit D with a (first) temperature T1 of about 140° C. When the solvent W is taken up, the temperature of the first heat transfer medium WT1 falls to a second temperature of from 90° C. to 100° C., as shown in FIG. 4. The solvent W, in particular water, is once again condensed in the region of the evaporation unit HPE. The heat energy Q that forms thereby is taken up during the evaporation of the second heat transfer medium WT2. With the aid of the compressor of the heat pump WP, the second heat transfer medium WT2 is transferred into the condensation unit HPC. In the condensation unit HPE, the second heat transfer medium is cooled 23a, condensed 21a and supercooled still further 27a. The majority of heat energy Q given off thereby by the second heat transfer medium WT2 is transferred to the first heat transfer medium WT1. Here, the temperature of the first heat transfer medium WT1 rises from the second temperature T2 to the first temperature T1. The first heat transfer medium WT1 is then fed back to the drying unit D.

Figure 6:
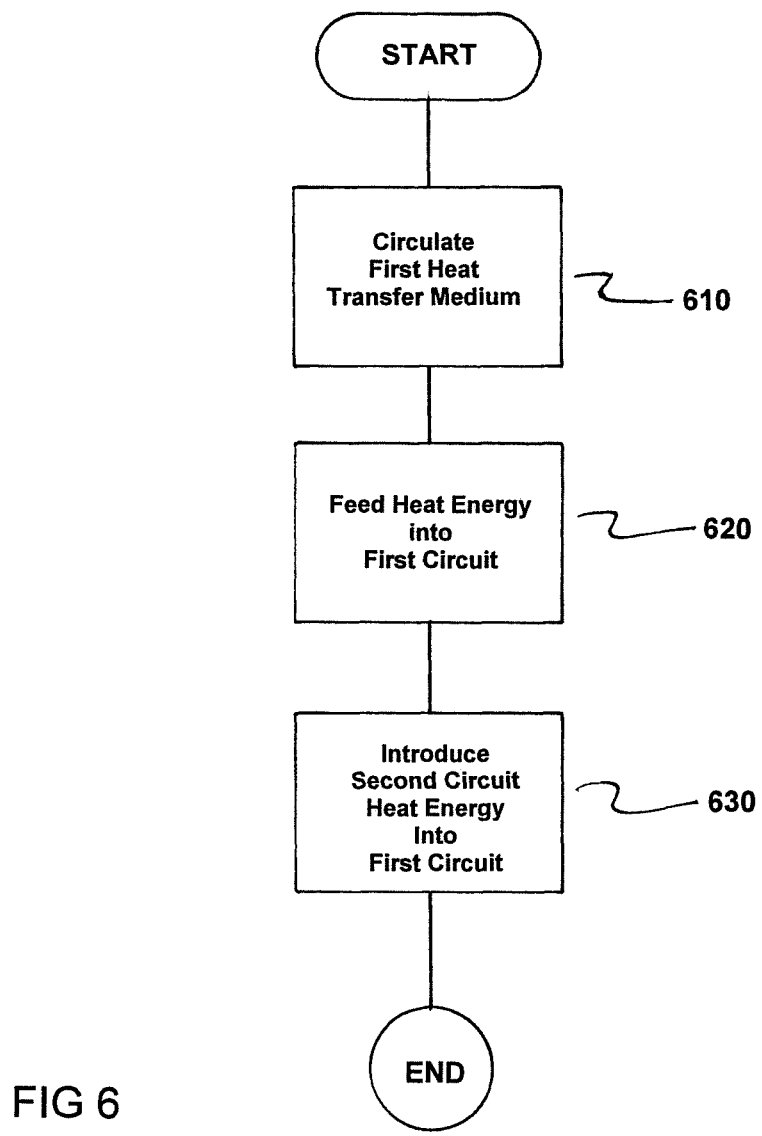
FIG. 6 is a flowchart of the method in accordance with the invention.

FIG. 6 is a flowchart of a method for drying drying-stock (GW) during production of a cellulose-containing fiber mat. With reference to FIG. 6, the method comprises circulating a first heat transfer medium (WT1) in a first circuit (1), as indicated in step 610. In accordance with the invention, the first heat transfer medium (WT1) heats the drying-stock (GW) and takes up solvent (W) released from the stock (GW). Next, heat energy (Q) is fed into the first circuit (1) by a second circuit (2), as indicated in step 620. The heat energy (Q) from the second circuit (2) is now introduced into the first circuit (1) by a heat pump (WP), as indicated in step 630.

In summary the disclosed embodiments of the invention relate to an apparatus and a method for drying-drying stock GW. In this context, the solvent-containing drying-stock GW is separated in a drying unit D into a base material G and a solvent W with the aid of a first heat transfer medium WT1. The first heat transfer medium WT1 passes through a first circuit 1. After the solvent W has been taken up by the first heat transfer medium WT1, the solvent W is separated from the heat transfer medium WT1 by condensation. The (condensation) heat energy Q is transferred by a heat exchanger WT with the aid of an evaporation unit HPE to a second circuit 2 and provided for a second heat transfer medium WT2. With the aid of a heat pump WP, the heat energy Q in a condensation unit HPC of the heat pump WP is fed back to the first circuit 1.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus for drying drying-stock during production of a fiber mat, the apparatus comprising:
   a drying unit in a first circuit, a first heat transfer medium being provided for drying the drying stock;
   a second circuit for a second heat transfer medium comprising a liquid made of a halogenated hydrocarbon comprising one of R1233zd(E) and R1336mzz(Z), the second circuit being in heat transfer communication with the first circuit and comprising a heat pump for feeding heat energy from the liquid made from the halogenated hydrocarbon comprising one of R1233zd (E) and R1336mzz(Z) into the first circuit; and
   a compressor included within the heat pump and controlled by a control device having sensors located in the first circuit.

2. The apparatus as claimed in claim 1, wherein the second circuit draws heat energy from the first circuit.

3. The apparatus as claimed in claim 2, further comprising:
   at least one further heat pump for feeding heat energy into at least one of (i) the first circuit and (ii) into the second circuit.

4. The apparatus as claimed in claim 1, further comprising:
   at least one further heat pump for feeding heat energy into at least one of (i) the first circuit and (ii) into the second circuit.

5. The apparatus as claimed in claim 1, wherein the first circuit and the second circuit are only connected by heat exchangers.

6. The apparatus as claimed in claim 1, further comprising:
   an evaporation unit for feeding the heat energy from the first circuit into the second circuit.

7. The apparatus as claimed in claim 1, wherein the first circuit comprises a blower.

8. The apparatus as claimed in claim 1, further comprising:
   a condensation unit for feeding the heat energy into the first circuit.

9. The apparatus as claimed in claim 1, wherein the first heat transfer medium for the first circuit comprises one of (i) water vapor and (ii) a mixture of water vapor and air.

10. A paper mill comprising the apparatus as claimed in claim 1.

* * * * *